(12) United States Patent
Jahnle et al.

(10) Patent No.: US 11,584,072 B2
(45) Date of Patent: Feb. 21, 2023

(54) PRINT HEAD FOR A 3D PRINTER

(71) Applicant: Robert Bosch GmbH, Stuttgart (DE)

(72) Inventors: Hendrik Jahnle, Leutenbach (DE); Norman Lung, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 53 days.

(21) Appl. No.: 16/757,442

(22) PCT Filed: Oct. 17, 2018

(86) PCT No.: PCT/EP2018/078403
§ 371 (c)(1),
(2) Date: Apr. 20, 2020

(87) PCT Pub. No.: WO2019/076982
PCT Pub. Date: Apr. 25, 2019

(65) Prior Publication Data
US 2021/0187842 A1 Jun. 24, 2021

(30) Foreign Application Priority Data
Oct. 19, 2017 (DE) ...................... 10 2017 218 707.7

(51) Int. Cl.
*B29C 64/209* (2017.01)
*B29C 64/295* (2017.01)
(Continued)

(52) U.S. Cl.
CPC .......... *B29C 64/209* (2017.08); *B29C 64/106* (2017.08); *B29C 64/118* (2017.08);
(Continued)

(58) Field of Classification Search
CPC ... B29C 64/209; B29C 64/321; B29C 64/364; B29C 64/118; B29C 64/295;
(Continued)

(56) References Cited

U.S. PATENT DOCUMENTS

| | | | |
|---|---|---|---|
| 5,649,277 A | 7/1997 | Greul et al. | |
| 6,030,203 A | * 2/2000 | Kuroda | B29C 45/18 |
| | | | 425/561 |

(Continued)

FOREIGN PATENT DOCUMENTS

| | | |
|---|---|---|
| CN | 104755244 A | 7/2015 |
| DE | 102016222306 | 5/2018 |

(Continued)

OTHER PUBLICATIONS

Hirahara et al., EPO Machine Translation of JP 2015/168135 (Year: 2015).*

(Continued)

*Primary Examiner* — Seyed Masoud Malekzadeh
(74) *Attorney, Agent, or Firm* — Michael Best & Friedrich LLP

(57) ABSTRACT

The invention relates to a print head (10) for a 3D printer (1), comprising a feed section (11) having a feeder (12) for a starting material (21) that is variable in the viscosity thereof; a plasticizing zone (14) having a heater (15) and an outlet opening (16) for the liquid phase (22) of the starting material (21); and a conveying device (30) for conveying the starting material (21) from the feed section (11) to the plasticizing zone (14), wherein the conveying device (30) comprises a piston (31) that can be inserted into the feed section (11). The invention is characterized in that the piston (31) has a first piston portion (5) facing the plasticizing zone (14) and having a guide surface (9), through which the piston (31) is guided in a bore (7) of the print head (10).

7 Claims, 4 Drawing Sheets

(51) Int. Cl.
*B33Y 30/00* (2015.01)
*B29C 64/35* (2017.01)
*B29C 64/321* (2017.01)
*B29C 64/364* (2017.01)
*B29C 64/118* (2017.01)
*B29C 64/393* (2017.01)
*B29C 64/106* (2017.01)
*B33Y 50/02* (2015.01)

(52) U.S. Cl.
CPC .......... *B29C 64/295* (2017.08); *B29C 64/321* (2017.08); *B29C 64/364* (2017.08); *B29C 64/393* (2017.08); *B29C 64/35* (2017.08); *B33Y 30/00* (2014.12); *B33Y 50/02* (2014.12)

(58) Field of Classification Search
CPC ... B29C 64/393; B29C 48/365; B29C 48/388; B29C 64/35; B33Y 30/00; B33Y 50/02
USPC .......................................................... 425/100
See application file for complete search history.

(56) References Cited

U.S. PATENT DOCUMENTS

| | | | |
|---|---|---|---|
| 6,067,480 | A | 5/2000 | Stuffle et al. |
| 6,200,127 | B1 * | 3/2001 | Klaus ...................... B29C 45/52 425/557 |
| 10,279,541 | B2 * | 5/2019 | Tomuta .................. B29C 64/118 |
| 2009/0302497 | A1 * | 12/2009 | Schmidt ................ B29C 45/544 264/235 |
| 2010/0286613 | A1 * | 11/2010 | Ring ..................... F04B 17/042 604/152 |
| 2014/0328963 | A1 * | 11/2014 | Mark ..................... B33Y 50/02 425/143 |
| 2015/0314531 | A1 * | 11/2015 | Mark .................... B29C 64/209 264/241 |
| 2016/0082627 | A1 | 3/2016 | Kilim et al. |
| 2017/0001294 | A1 * | 1/2017 | Koizmui ................. B25D 9/12 |
| 2018/0304532 | A1 * | 10/2018 | Burnham .............. B29C 64/209 |
| 2020/0376768 | A1 * | 12/2020 | Bruggeman .......... B29C 64/106 |

FOREIGN PATENT DOCUMENTS

| | | | |
|---|---|---|---|
| DE | 102016222315 | | 5/2018 |
| JP | 2015/168135 | * 9/2015 | ............ B29C 67/00 |
| WO | 9002034 | | 3/1990 |
| WO | 2017081040 A1 | | 5/2018 |
| WO | 2018086792 | | 5/2018 |

OTHER PUBLICATIONS

International Search Report for Application No. PCT/EP2018/078403 dated Jan. 25, 2019 (English Translation, 2 pages).

* cited by examiner

PRINT HEAD FOR A 3D PRINTER

BACKGROUND OF THE INVENTION

The present invention relates to a print head for a 3D printer.

A 3D printer for a material of variable viscosity receives a solid phase of this material as the raw material, produces a liquid phase therefrom, and applies this liquid phase selectively at the locations which belong to the object to be created. Such a 3D printer comprises a print head in which the raw material is prepared for printing. Also provided are means for generating a relative movement between the print head and the working surface on which it is intended for the object to be formed. Either just the print head, just the working surface, or both the print head and the working surface can thus be moved.

The print head has a first operating state in which liquid material is discharged from it, and a second operating state in which no liquid material is discharged from it. The second operating state is assumed, for example, when it is intended to move to a different position on the working surface and that no material is deposited en route. It is possible to switch, for example, between the two operating states of the print head by switching the advance of the solid raw material on and off.

The most common method is "fused deposition modeling" (FDM), in which a filament of the raw material is melted in an electrically heated extruder nozzle and applied to a platform in layers. In such a filament form, the raw material is very expensive. It is proposed in US 2016/082 627 A1 to feed in the raw material in pellets and convey it by means of a screw conveyor to a heated zone from which it is discharged in plasticized form. On the one hand, pellets are less expensive and, on the other hand, mixtures of different thermoplastic materials can be produced simply in this way.

It is moreover known from the application DE102016222306 which had not yet been published at the date of this application to plasticize pellets by means of a piston and a heated path. When the piston presses against the pellets, they are compressed and conveyed to a plasticization zone. Forces occur here which highly stress the piston and a cylinder wall of the print head.

SUMMARY OF THE INVENTION

The object of the invention is to provide a print head which withstands the forces which occur and permits a stable printing process.

A print head for a 3D printer has been developed as part of the invention. This print head comprises an intake zone with a feeder for a raw material of variable viscosity, a plasticization zone with a heater and a discharge opening for the liquid phase of the raw material, and a conveyor device for conveying the pellets from the intake zone into the plasticization zone, wherein the conveyor device comprises a piston which can be inserted into the intake zone.

A feeder for raw material present as pellets can in particular be provided here. The raw material can in particular be a thermoplastic material.

The print head according to the invention can have a more compact structure compared to a print head which transports the pellets by means of a screw conveyor. This in turn has the consequence that the print head can be moved more easily and simply. This is particularly advantageous when the print head needs to be moved very quickly, in particular at speeds of 100 mm/s or more.

It has moreover surprisingly been noted that the quality of the material is maintained better when the raw material is conveyed by means of the piston than when it is conveyed by means of a screw conveyor.

On the one hand, the period for which the material remains above its melting point can be significantly reduced such that it degenerates thermally to a lesser extent. Decomposition products, primarily gases, which accelerate further decomposition of the material owing to the pressures prevailing in the system and also directly influence its quality, occur as a result of the excessively high thermal stress. This is manifested, for example, in fluctuations in the extruded volume or also discoloration, surface burning, or foaming of the extruded material. Furthermore, coatings are formed in the system which become detached and block up the system or are passed into the object to be produced as loose particles. Moreover, material can also be extruded unwantedly owing to the pressure of gaseous decomposition products. If the discharge opening is closed by a valve, it is even possible here for an excess pressure to build up and the print head to explode. If the discharge opening is closed by solid decomposition products, it is also possible for a pressure to build up in the print head which can be discharged in an explosive extrusion of hot material. Because of the residual heat, this can also occur when the supply of energy to the heater of the print head has already been switched off by a safety system.

On the other hand, no shearing forces which break up the polymer chains of the material are exerted on the material. The longer these polymer chains, the greater the mechanical strength of the ultimately obtained object with respect to tensile, compressive, and bending stress. The resistance of the object to chemical media is also better, the longer the polymer chains.

It is moreover possible to plasticize volumes that can be as small as desired, whereas it is always necessary for a certain minimum quantity of material to be plasticized in the case of delivery by means of a screw conveyor. A screw conveyor requires such a minimum quantity to build up the thrust forces which are essential for the functioning of the screw conveyor.

According to the invention, the piston has a first piston section which faces the plasticization zone and has a guide surface by means of which the piston is guided in a bore of the print head.

Such an arrangement of the guide surface of the piston advantageously prevents the piston from seizing up and jamming in the bore of the print head, as a result of which virtually wear-free operation of the print head is enabled. The invention ensures that the piston is always guided optimally in the bore of the print head and is not deflected when it strikes the pellets. Continuous and long-term operation of the print head is enabled as a result.

In an advantageous development, the axial extent of the guide surface is longer than a maximum axial extent of an opening area of the feeder leading to the bore.

The size of the opening area of the feeder to the bore is relevant for the quantity of the fed pellets from the feeder into the bore of the print head, or into the intake zone of the print head.

The protrusion enabled by the invention of the guide surface of the piston with respect to the opening area of the feeder advantageously ensures stable guidance of the piston in the bore.

Particularly advantageous developments of the invention result in the case of an axial extent of the guide surface of the piston which is between 1.1 and 1.3 times the maximum axial extent of the opening area. If the guide surface is chosen to be longer, the life of the piston is reduced because it is guided in too rigid a fashion and consequently tolerances can no longer be compensated. It is advantageously obtained that the piston is guided optimally and the life of the print head is increased specifically when the axial extent of the guide surface of the piston is 1.2 times the maximum axial extent of the opening area.

In a development of the invention, the axial extent of the guide surface of the piston is between 1 and 2.5 times a piston diameter of the first piston section. This region advantageously enables optimum guidance of the piston in the bore, as a result of which the life of the print head is increased. In the case of a lower value, the likelihood of the print head failing increases, and at higher values very precisely machined and matched components are required which are both expensive and may also have a reduced strength and hence be more prone to faults. It is advantageously obtained that the piston is guided optimally and the life of the print head is increased specifically when the axial extent of the guide surface of the piston is 1.25 times the piston diameter of the first piston section.

In a development, the piston has a second piston section, the piston diameter of which is smaller than the piston diameter of the first piston section, as a result of which the piston is advantageously not guided in this section.

In a further embodiment of the invention, the piston has a groove which is arranged between the first piston section and a third piston section, wherein, in a development the third piston section is arranged between the first and the second piston section, wherein the first piston section and the third piston section have the same piston diameter.

Owing to the arrangement of the groove between the first and the third piston section which each have the same piston diameter, the state of the piston head or the extruder can advantageously be evaluated by the groove being checked for contaminants during a maintenance interval. If there are no contaminants or a coating of the raw material in the groove, the temperature for heating the raw material, and the guidance of the piston are, for example, set correctly.

BRIEF DESCRIPTION OF THE DRAWINGS

Further measures improving the invention are explained in detail below in conjunction with the description of the preferred exemplary embodiments of the invention, with the aid of the drawings.

EXEMPLARY EMBODIMENTS

Figure 1:
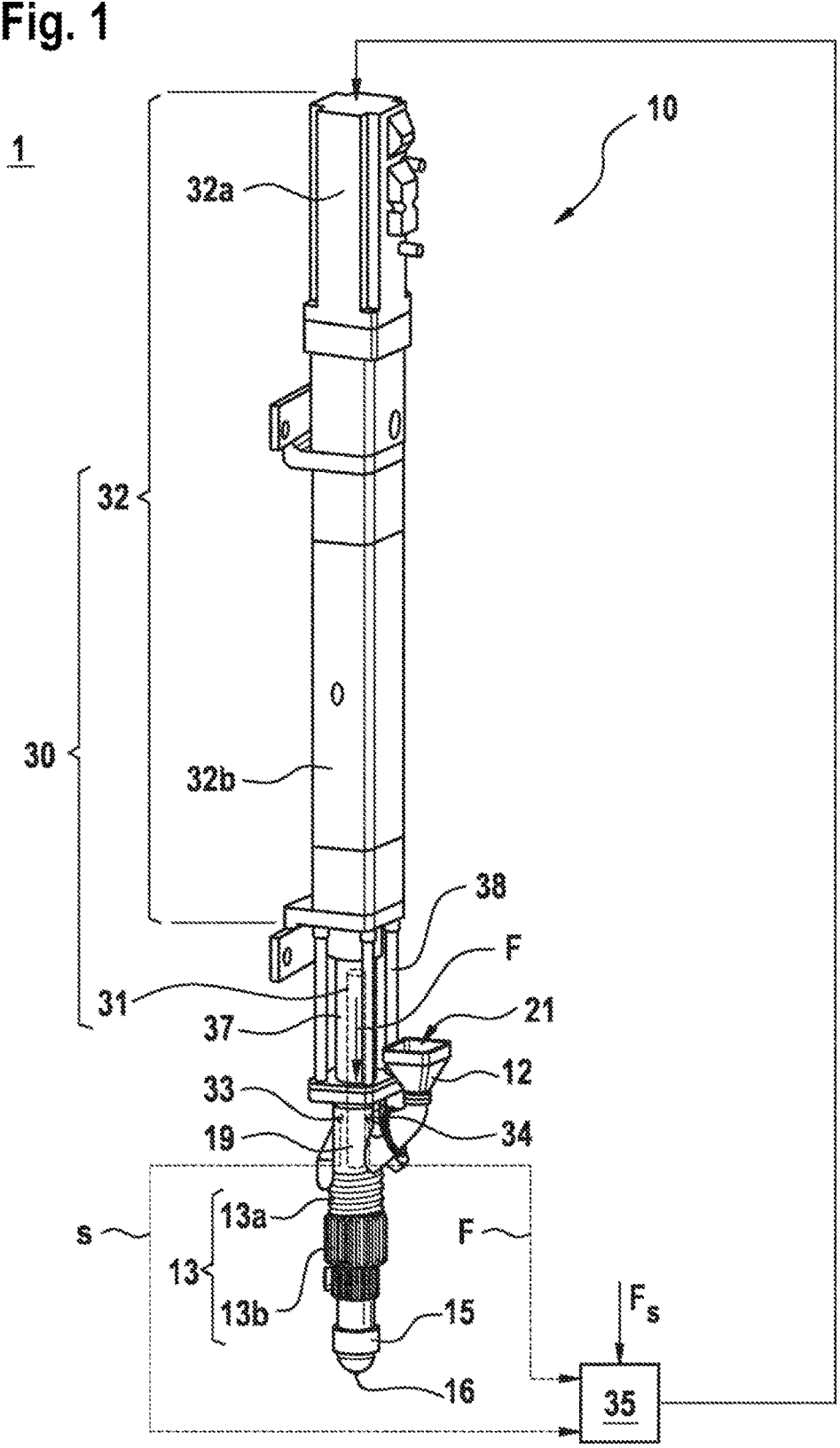
Figure 2:
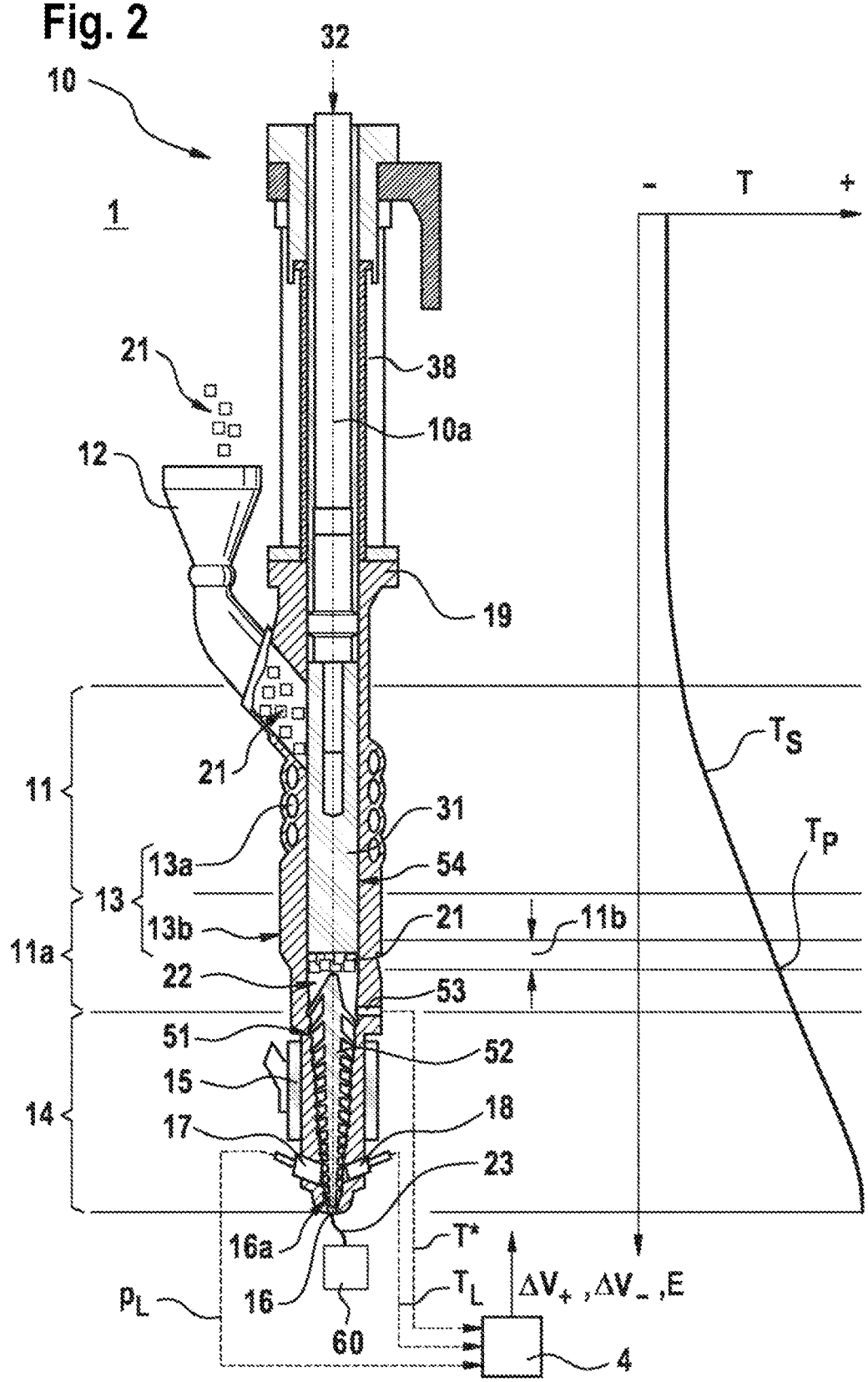
Figure 3:
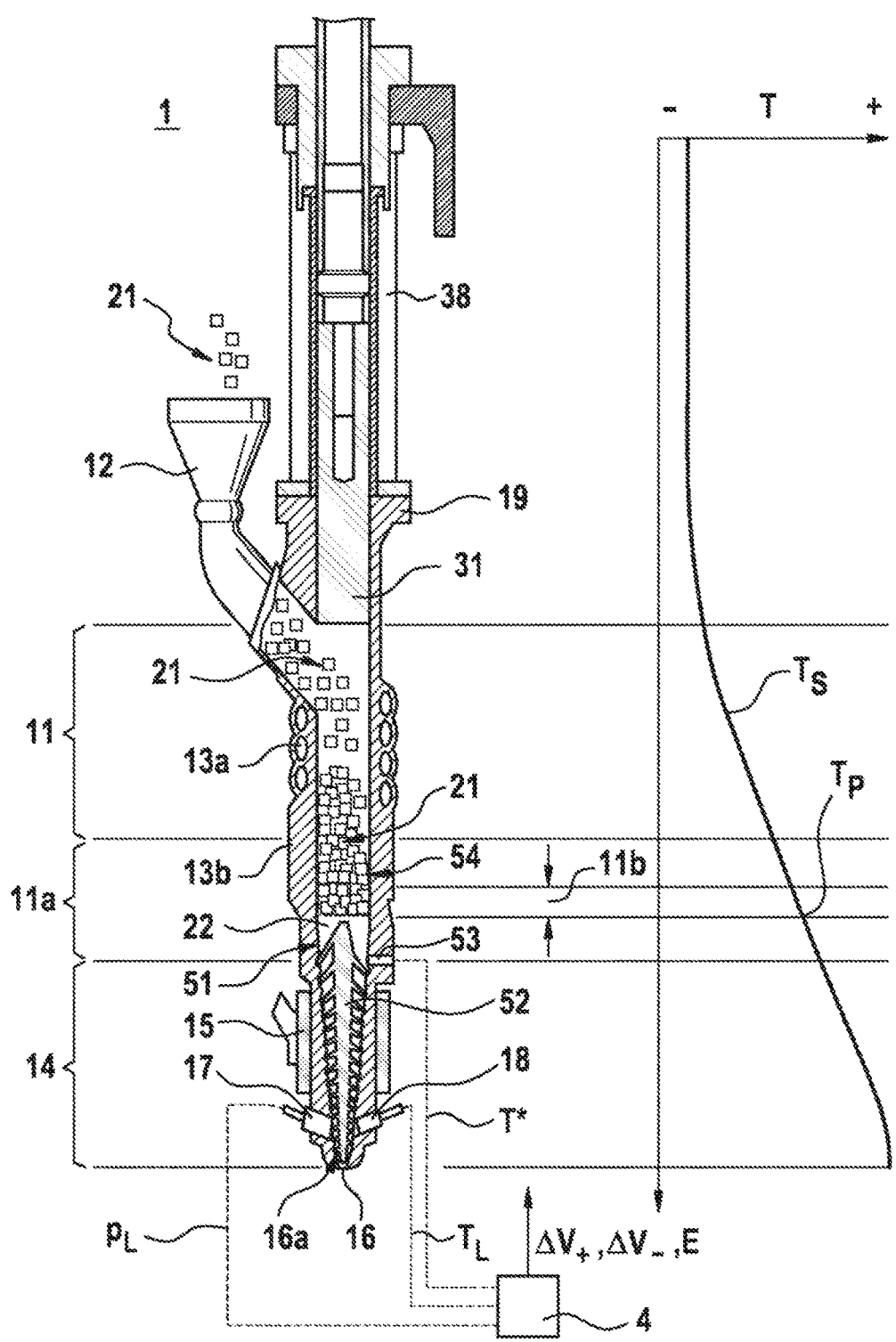
Figure 4:
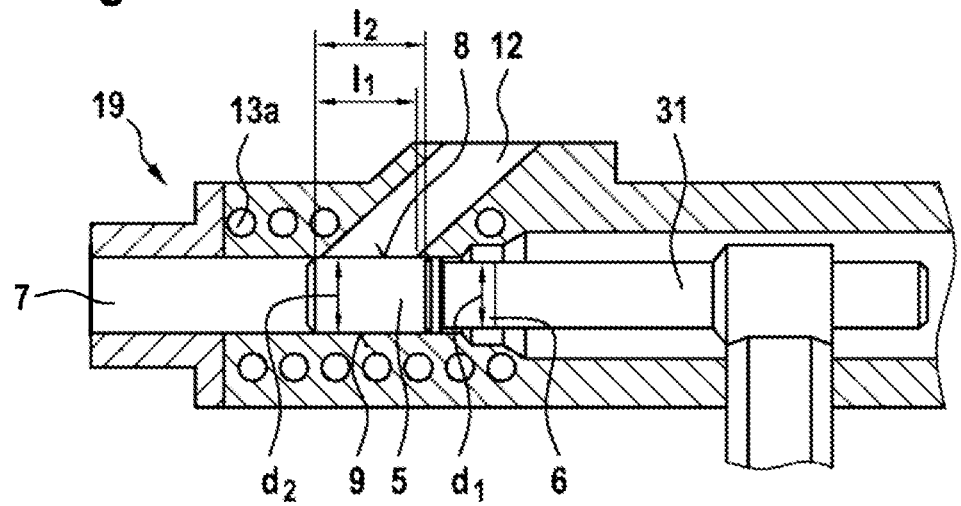

In the drawings:

FIG. 1 shows a print head according to the invention;

FIG. 2 shows a drawing in section of the print head in printing mode;

FIG. 3 shows a drawing in section of the print head in non-printing mode;

FIG. 4 shows a first exemplary embodiment for a print head; and

Figure 5:
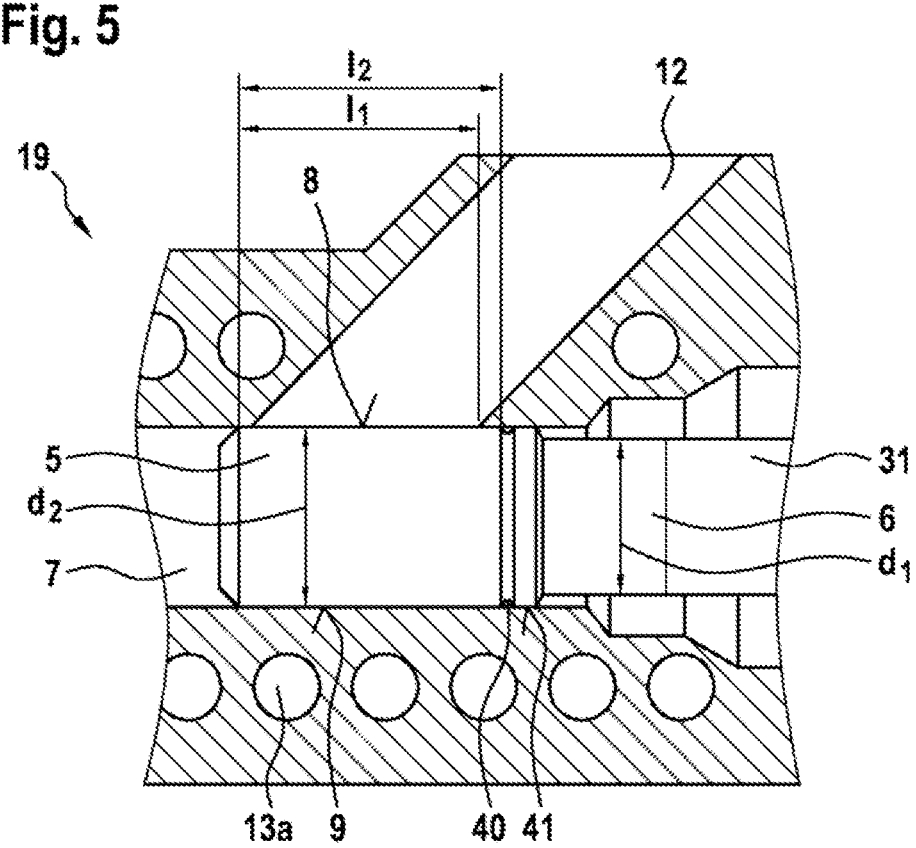

FIG. 5 shows a second exemplary embodiment for a print head.

DETAILED DESCRIPTION

FIG. 1 shows a print head 10 in a perspective external view. The print head 10 has a housing 19 which has a funnel-like feeder 12 for a raw material 21 in the form of pellets 21. The housing 19 merges at the top into an intermediate piece 38. This intermediate piece 38 comprises a cylinder 37 in which a piston 31 is guided. In the view chosen in FIG. 1, the piston 31 is covered by the cylinder 37 and is therefore only indicated. The movement of the piston 31 is driven by means of an electromotor 32a, the rotational movement of which is converted into a linear movement by a mechanical spindle 32b. The piston 31 and the drive source 32 together form a conveyor device 30 for conveying the pellets 21.

The travel s of the piston 31 is measured by a travel measurement system 33. The force F with which the piston 31 presses against the pellets 21 is measured by a force sensor 34. The force F and the travel s are fed to an active control system 35 which moreover receives a target value $F_s$ for the force F as an input and actuates the electromotor 32a with the effect that the actual force F is maintained at a level matching the target value $F_s$. By measuring the travel s, it is thus ensured that the constraint is met that the piston 31 is to come into contact only with the completely solid pellets 21 of the raw material 20 but not with an at least partially plasticized phase which clogs the piston 31.

In the upper region which faces the feeder 12, the housing 19 is formed by cooling means 13 which comprise an active cooler 13a with a coolant and a passive cooler 13b with cooling ribs. In the lower region which faces the discharge opening 16, the housing 16 is in contrast surrounded at its outer periphery by a heating strip 15 which supplies the heating energy for plasticizing the raw material 21.

FIG. 2 shows the inside of the print head 10 in the part of the working cycle in which the printing takes place. An intake zone 11 into which the pellets 21 or the raw material 21 can be fed via the funnel-like feeder 12 is situated in the housing 19 of the print head 10. The piston 31 conveys the pellets 21 from the intake zone 11 into the plasticization zone 14, also termed the metering zone because the measuring of the raw material 21 into portions takes place here. The intake zone 11 adjoins the plasticization zone 14 via a compression zone 11a. The boundary layer 11b between highly compressed but still solid and non-sticky pellets 21, on the one hand, and material 22 which has begun to liquefy, on the other hand, is situated inside the compression zone 11a. In the position shown in FIG. 2, the front end of the piston 31 is situated precisely in this boundary layer 11b.

The interior of the housing 19 is formed in the upper region of the housing 19 up to and including the boundary layer 11b as an upright cylinder in which the piston 31 can be guided. The interior merges below into a fusion geometry 51. This fusion geometry 51 is distinguished, on the one hand, in that its internal cross-section tapers increasingly downward such that the pressure of the liquid material 22 or the liquid phase 22 increases more and more. On the other hand, the inner wall of the fusion geometry 51 has a structure which effects the mixing of the liquid phase 22 of the raw material 21. This structure can, for example, be rib-shaped, as drawn by way of example in FIG. 2. The heating strip 15, the heating output of which is distributed homogeneously over the liquid phase 22 by a heat transfer structure 52 (heat transfer torpedo) arranged in the interior of the housing 19, i.e. inside the liquid phase 22, is arranged in the plasticization zone 14 on the outer periphery of the housing 19. Any other type of heater is also possible instead of the heating strip 15 drawn by way of example in FIGS. 1 and 2. In the discharge opening 16 at the nearest front region 16a of the plasticization zone 14, the pressure $p_L$ of the liquid phase 22 is measured by a pressure sensor 17 and the temperature $T_L$ of the liquid phase 22 is measured by a temperature sensor 18. The region 16a is just a few cubic millimeters large such that no excess pellets 21 are fused. The heat transfer structure 52 ensures that the liquid phase 22 of the raw material 21 in the region 16a always has the highest possible viscosity without overheating.

The measured values for $p_L$ and $T_L$ are forwarded to an evaluation unit 4 which additionally receives as an input the measured temperature value T* of a further temperature sensor 53 arranged at the very upper limit of the plasticization zone 14.

A strand 23 is pushed through the discharge opening 16 of the print head 10, from the liquid phase 22 of the raw material, by the pressure $p_L$ generated by the piston 31 and is deposited on an object 60 to be manufactured. The evaluation unit 4 calculates, on the one hand, by what amount $\Delta V_+$ the volume of the strand 23 increases owing to the relaxation of the high pressure $p_L$ and, on the other hand, by what amount $\Delta V_-$ this volume decreases owing to the cooling of the high temperature $T_L$. At the same time, the energy input E into the object 60 by the deposited material 23 is also calculated.

The piston 31 is guided in the housing 19 with a small ventilation gap 54. Ambient air which is contained in the bulk material of the pellets 21 and is freed when this bulk material is compressed can be discharged through this gap 54. Gases which occur during the plasticization or partial decomposition of the raw material 21 can also be discharged by the same route.

As already indicated in FIG. 1, the housing 19 is cooled between the boundary layer 11b and the feeder 12 by cooling means 13 which are formed by the active cooler 13a with a flowing coolant and by the passive cooler 13b by means of cooling ribs. As a result, the temperature TS inside the intake zone 11, which rises gradually from top to bottom, is constantly maintained below the temperature TP above which the raw material 21 is plasticized. TP is reached at the very bottom end of the boundary layer 11b. Because the intake zone 11 is permanently temperature-controlled to a suitable temperature, premature fusion of the pellets 21, clogging of the intake zone 11, and the ingress of water due to condensation are prevented. This temperature control also controls the precise position of the boundary layer 11b and can maintain it in particular in a constant position.

The temperature curve along the longitudinal axis 10a of the print head 10 from cold (−) to hot (+) is indicated qualitatively to the right of the print head 10.

FIG. 3 shows the same print head 10 in the same view as in FIG. 2 except that here the piston 31 has been retracted upward, behind the intake zone 11. On the one hand, this has the effect that, in the state shown in FIG. 3, no strand 23 of raw material 21 is discharged from the discharge opening 16. On the other hand, the intake zone 11 is free for fresh pellets 21 to trickle in. When the piston 31 is lowered again, as shown in FIG. 2, the fresh pellets 21 are compressed and plasticized in the plasticization zone 14 before emerging from the discharge opening 16 as a strand 23.

FIG. 4 shows a first exemplary embodiment of the print head 10 according to the invention in a drawing in section. The piston 31 has a first piston section 5, facing the plasticization zone 14, with a guide surface 9 by means of which the piston 31 is guided in a bore 7 of the print head 10 or the housing 19.

The axial extent L2 of the guide surface 9 is longer than a maximum axial extent L1 of an opening area 8 of the feeder 12 leading to the bore 7. The opening area 8 of the feeder 12 leading to the bore 7 is designed such that the fed pellets 21 can be fed optimally into the bore or into the intake zone 11.

In this embodiment, the axial extent L2 of the guide surface 9 of the piston 31 is 1.2 times the maximum axial extent L1 of the opening area 8.

The first piston section 5 moreover has a piston diameter d2, wherein the axial extent L2 of the guide surface 9 of the piston 31 is preferably 1.25 times the piston diameter d2 of the first piston section 5.

The piston 31 illustrated with the correspondingly dimensioned guide surface 9 prevents the piston 31 from jamming in the bore 7 and reduces the penetration of the deformed pellets into the gap between the guide surface 9 and the bore 7.

The piston 31 moreover has a second piston section 6, the piston diameter d1 of which is smaller than the piston diameter d2 of the first piston section 5.

FIG. 5 shows a second exemplary embodiment of the print head 10, wherein the piston 31 has a groove 40 which is arranged between the first piston section and a third piston section 41.

The third piston section 41 is arranged between the first 5 and the second 6 piston section and has the same piston diameter d2 as the first piston section 5.

The groove 40 is used to evaluate the quality of the print head settings by the groove 40 being checked for deposits during the maintenance intervals.

In this embodiment, the axial extent L2 of the guide surface 9 of the piston 31 is 1.2 times the maximum axial extent L2 of the opening area 8 and extends as far as the groove 40.

The print head 10 can be integrated into any 3D printer.

What is claimed is:

1. A print head (10) for a 3D printer (1), the print head (10) comprising an intake zone (11) with a feeder (12) for a raw material (21) of variable viscosity, a plasticization zone (14) with a heater (15) and a discharge opening (16) for a liquid phase (22) of the raw material (21), and a conveyor device (30) for conveying the raw material (21) from the intake zone (11) into the plasticization zone (14), wherein the conveyor device (30) comprises a piston (31) configured to be inserted into the intake zone (11), characterized in that the piston (31) has a first piston section (5) with a piston diameter (d2), the first piston section (5) faces the plasticization zone (14) and has a guide surface (9) defining the piston diameter (d2) and by which the piston (31) interacts with a bore (7) of the print head (10) such that the first piston section (5) is guided in the bore (7), wherein the piston (31) has a second piston section (6), with a piston diameter (d1) of which is smaller than the piston diameter (d2) of the first piston section (5), wherein the piston (31) has a groove (40) which is arranged between the first piston section (5) and a third piston section (41), the third piston section (41) being arranged between the first piston section (5) and the second piston section (6), wherein the groove is an empty space, and wherein the groove is configured to be checked for deposits during maintenance intervals to evaluate settings of the print head (10).

2. The print head (10) as claimed in claim 1, characterized in that an axial extent (L2) of the guide surface (9) is longer than a maximum axial extent (L1) of an opening area (8) of the feeder (12) leading to the bore (7).

3. The print head (10) as claimed in claim 2, characterized in that the axial extent (L2) of the guide surface (9) of the piston (31) is between 1.1 and 1.3 times the maximum axial extent (L1) of the opening area (8).

4. The print head (10) as claimed in claim 2, characterized in that the axial extent (L2) of the guide surface (9) of the piston (31) is 1.2 times the maximum axial extent (L1) of the opening area (8).

5. The print head (10) as claimed in claim 1, characterized in that an axial extent (L2) of the guide surface (9) of the piston (31) is between 1 and 2.5 times the piston diameter (d2) of the first piston section (5).

6. The print head (10) as claimed in claim 5, characterized in that the axial extent (L2) of the guide surface (9) of the piston (31) is 1.25 times the piston diameter (d2) of the first piston section (5).

7. The print head (10) as claimed in claim 1, characterized in that the first piston section (5) and the third piston section (41) have the same piston diameter (d2).

* * * * *